United States Patent
Shimizu et al.

(10) Patent No.: US 7,569,168 B2
(45) Date of Patent: Aug. 4, 2009

(54) METHOD OF PRODUCING POLYMER OPTICAL WAVEGUIDE

(75) Inventors: Keishi Shimizu, Ashigarakami-gun (JP); Shigemi Ohtsu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 798 days.

(21) Appl. No.: 10/936,639

(22) Filed: Sep. 9, 2004

(65) Prior Publication Data

US 2005/0163446 A1   Jul. 28, 2005

(30) Foreign Application Priority Data

Jan. 23, 2004   (JP) ............................. 2004-015388

(51) Int. Cl.
   *B29D 11/00*   (2006.01)
(52) U.S. Cl. ...................... 264/1.24; 264/1.38
(58) Field of Classification Search ................. 264/1.1, 264/1.24, 1.36, 1.38; 385/14
   See application file for complete search history.

(56) References Cited

U.S. PATENT DOCUMENTS

| | | | |
|---|---|---|---|
| 4,884,434 A | 12/1989 | Satake et al. | |
| 5,716,556 A | 2/1998 | Heard | |
| 5,949,945 A | 9/1999 | Okano et al. | |
| 5,999,670 A | 12/1999 | Yoshimura et al. | |
| 6,243,517 B1 | 6/2001 | Deacon | |
| 6,314,228 B1 | 11/2001 | Korenaga et al. | |
| 6,355,198 B1 | 3/2002 | Kim et al. | |
| 6,500,603 B1 | 12/2002 | Shioda | |
| 6,901,198 B2 | 5/2005 | Shimizu et al. | |
| 6,968,109 B2 | 11/2005 | Furuyama | |
| 7,174,057 B2 | 2/2007 | Shimizu et al. | |
| 7,294,292 B2 | 11/2007 | Akutsu et al. | |
| 7,317,861 B2 | 1/2008 | Ohtsu et al. | |
| 2002/0114556 A1 | 8/2002 | Kato et al. | |
| 2005/0133943 A1 | 6/2005 | Akutsu et al. | |
| 2005/0238278 A1 | 10/2005 | Nakashiba et al. | |

FOREIGN PATENT DOCUMENTS

| | | |
|---|---|---|
| JP | A 60-250915 | 12/1985 |
| JP | A 02-155704 | 6/1990 |
| JP | A 05-066435 | 3/1993 |

(Continued)

OTHER PUBLICATIONS

Whitesides et al., "The Art of Building Small," Scientific American, pp. 39-47, Sep. 2001.

(Continued)

*Primary Examiner*—Mathieu D. Vargot
(74) *Attorney, Agent, or Firm*—Oliff & Berridge, PLC (57) ABSTRACT

A method of producing a polymer optical waveguide, the method including preparing a core-forming mold having a concave portion corresponding to at least one optical waveguide core, bringing a concave side of the core-forming mold into close contact with a flat substrate, filling a core-forming curable resin into the concave portion by suction and/or by utilizing a capillary phenomenon, curing the core-forming curable resin to form an optical waveguide core, and removing the optical waveguide core from the core-forming mold and the flat substrate.

10 Claims, 2 Drawing Sheets

FOREIGN PATENT DOCUMENTS

| | | |
|---|---|---|
| JP | A 06-114845 | 4/1994 |
| JP | A 06-216175 | 8/1994 |
| JP | A 06-304933 | 11/1994 |
| JP | A 08-507800 | 8/1996 |
| JP | A 09-269429 | 10/1997 |
| JP | A 10-090532 | 4/1998 |
| JP | A 10-130323 | 5/1998 |
| JP | A 10-300961 | 11/1998 |
| JP | A 11-003545 | 1/1999 |
| JP | A 2000-039530 | 2/2000 |
| JP | A 2000-039531 | 2/2000 |
| JP | A 2000-81520 | 3/2000 |
| JP | A 2000-235127 | 8/2000 |
| JP | 3151364 | 1/2001 |
| JP | A 2001-027714 | 1/2001 |
| JP | A 2001-269958 | 10/2001 |
| JP | A 2002-086462 | 3/2002 |
| JP | A 2002-086515 | 3/2002 |
| JP | A 2002-088120 | 3/2002 |
| JP | A 2002-090565 | 3/2002 |
| JP | A 2002-146066 | 5/2002 |
| JP | A 2002-284812 | 10/2002 |
| JP | A 2002-311273 | 10/2002 |
| JP | A 2002-333538 | 11/2002 |
| JP | A 2002-365429 | 12/2002 |
| JP | A 2003-084157 | 3/2003 |
| JP | A 2004-029507 | 1/2004 |
| JP | A 2004-086144 | 3/2004 |
| JP | A 2004-109927 | 4/2004 |

OTHER PUBLICATIONS

Xia et al., "Soft Lithography," Annu. Rev. Mater. Sci., pp. 153-184, 1998.

U.S. Appl. No. 10/801,803 to Akutsu et al. filed Mar. 17, 2004.

B. Michel et al., "Printing Meets Lithography: Soft Approaches to High-Resolution Patterning," IBM J. Res. & Dev., vol. 45, No. 5, pp. 697-719, Sep. 2001.

X. Zhao et al., "Fabrication of Single-Mode Polymeric Waveguides Using Micromolding in Capillaries", Advanced Materials, vol. 8, No. 5, pp. 420-424, May 1996.

H. Shinohara, "Chemistry & Economy", vol. 44, No. 14, pp. 74-82, Dec. 1997.

Y. Wada, "Function & Materials", vol. 13, No. 1, pp. 40-52, Jan. 1993.

Y. Wada, "A New Transparent Polymer with Excellent Heat Resistance", Function & Materials, vol. 20, No. 8, pp. 16-22, Aug. 2000.

METHOD OF PRODUCING POLYMER OPTICAL WAVEGUIDE

CROSS-REFERENCE TO RELATED APPLICATION

This application claims priority under 35USC 119 from Japanese Patent Application No. 2004-15388, the disclosure of which is incorporated by reference herein.

BACKGROUND OF THE INVENTION

1. Field of the Invention

The present invention relates to a method of reproducing a flexible polymer optical waveguide at low costs.

2. Description of the Related Art

As a method of producing a polymer optical waveguide, the following methods have been proposed: (1) a method in which a film is impregnated with a monomer, a core part is selectively exposed to light to change the refractive index thereof and the film is then applied to the core part (selective polymerization method); (2) a method in which a core layer and a clad layer are applied to each other and then a clad part is formed by using reactive ion etching (RIE method); (3) a method using a photolithographic method in which a UV curable resin obtained by adding a photosensitive material in a polymer material is used to carry out exposure and developing (direct exposure method); (4) a method using injection molding; and (5) a method in which a core layer and a clad layer are applied to each other and then a core part is exposed to light to change the refractive index of the core part (photobleaching method). However, the selective polymerization method (1) has a problem concerning the application of the film, the methods (2) and (3) are expensive methods because a photolithographic method is used, and the method (4) has a problem concerning the accuracy of a core diameter. The method (5) has the problem that a sufficient difference in refractive index cannot be obtained. Currently, only the methods (2) and (3) have superior performance in practical use. However, none of these methods (1) through (5) is applicable to the formation of a polymer optical waveguide on a flexible plastic base material having a large area.

In the meantime, David Heard who is with Sharp Corporation has proposed a method in which a pattern substrate formed with a groove pattern which is to be a capillary is secured to a flat plate by using a clamp jig and the pressure in the system is reduced to fill a monomer solution into the capillary thereby producing a polymer optical waveguide (see Japanese Patent No. 3151364). However, this method has the drawbacks that if the substrate is not brought into close contact with the flat plate by using a clamp, parts other than the core part are impregnated with the monomer solution, whereby a precise waveguide structure cannot be formed, and that the monomer solution changes volumetrically when it is reacted with the polymer and fixed, causing the shape of the core to be changed. The method also has the drawback that the shape of the core is deformed when removing the capillary because the polymer with which the monomer solution has been reacted is partially stuck to the capillary.

Also, George M. Whitesides et al. of Harvard University have recently proposed a method called capillary micro-molding as one of soft lithographic methods in new technologies for making a nano-structure. This is a method in which a master substrate is made using photolithography, the nano-structure of the master substrate is accurately copied on a mold of a polydimethylsiloxane (PDMS) by utilizing the adhesiveness and easy releasability of the PDMS, and a liquid polymer is caused to flow into the mold by utilizing a capillary phenomenon and solidified. A detailed explanatory article appeared in SCIENTIFIC AMERICAN September 2001 (Nikkei Science, December issue (2001)). Also, Kim Enoch et al. of the George M. Whitesides group at Harvard University have obtained a patent concerning a capillary micro-molding method (see U.S. Pat. No. 6,355,198). However, the production method described in this patent has the drawbacks that in the case of a small sectional area such as that of the core part of an optical waveguide, a lot of time is required, making this method unsuitable for mass-production, and that a change in volume is caused when the monomer solution is reacted with the polymer and solidified, leading to a change in the shape of the core.

In light of this situation, the present inventors have proposed a method of producing a flexible polymer optical waveguide provided with an optical waveguide on a film base material (Japanese Patent Application Laid-Open (JP-A) No. 2004-86144). In this method, the production process is very simplified, so that a polymer optical waveguide can be produced with ease, and this method can therefore produce a polymer optical waveguide at much lower costs as compared with conventional methods of producing a polymer optical waveguide.

However, the aforementioned polymer optical waveguide has a structure in which the optical waveguide core is sandwiched between film base materials, and it is therefore difficult to make the waveguide film have a thickness equal to or less than twice the thickness of the above-mentioned film base material. Also, in the case of using a commercially available inexpensive base material that may be used as a waveguide film, there is the possibility that flexibility requirements are not fulfilled. Therefore, polymer optical waveguides for which flexibility is regarded as important preferably have a thickness smaller than twice the thickness of the film base material.

SUMMARY OF THE INVENTION

The present invention has been made in view of the above-described circumstances and provides a method of producing a polymer optical waveguide at low costs by using a simple method, the method enabling the production of a polymer optical waveguide having a desired thickness, and particularly, a polymer optical waveguide having a thin film.

An aspect of the present invention is to provide a method of producing a polymer optical waveguide, the method comprising: preparing a core-forming mold having a concave portion corresponding to at least one optical waveguide core; bringing a concave side of the core-forming mold into close contact with a flat substrate; filling a core-forming curable resin into the concave portion by suction and/or by utilizing a capillary phenomenon; curing the core-forming curable resin to form an optical waveguide core; and removing the optical waveguide core from the core-forming mold and the flat substrate.

The invention can provide a method of producing a polymer optical waveguide at low costs by using a simple method, the method enabling the production of a polymer optical waveguide having a desired thickness, and particularly, a polymer optical waveguide having a thin film.

DETAILED DESCRIPTION OF THE INVENTION

The method of producing a polymer optical waveguide according to the present invention comprises: preparing a core-forming mold (which may be made of a silicone resin) having a concave portion corresponding to at least one optical waveguide core; bringing a concave side of the core-forming mold into close contact with a flat substrate; filling a core-forming curable resin into the concave portion by suction and/or by utilizing a capillary phenomenon; curing the core-forming curable resin by a curing means to form an optical waveguide core; and removing the optical waveguide core from the core-forming mold and the flat substrate.

The method of producing a polymer optical waveguide of the invention will be hereinafter explained.

FIGS. 1A through 1F are views explaining the outline of the method of producing a polymer optical waveguide according to the invention having one optical waveguide core.

Figure 1A:
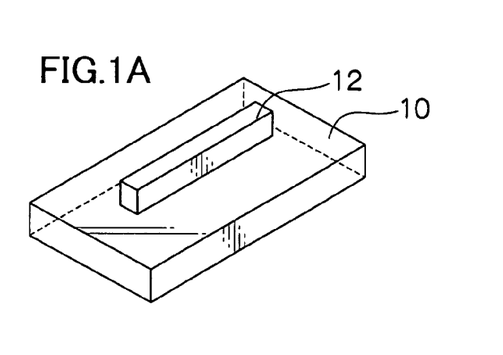
FIGS. 1A through 1F are views explaining the outline of a method of producing a polymer optical waveguide in an embodiment having one optical waveguide core.
Figure 1B:
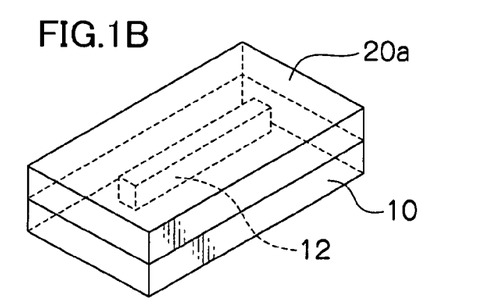
Figure 1C:
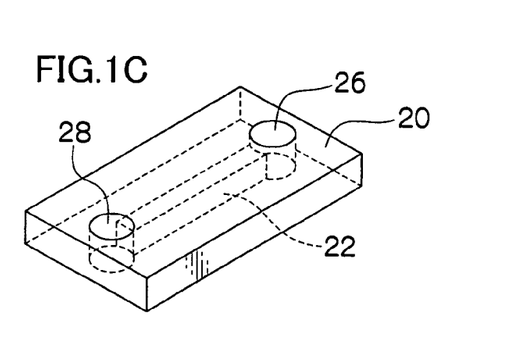

FIG. 1A shows a master plate 10 wherein 12 represents a convex part corresponding to an optical waveguide core. A mold-forming curable resin is applied or cast to the surface of the master plate, on which surface the convex portion is to be formed and then cured to form a cured resin layer (see FIG. 1B). In FIG. 1B, 20a represents the cured resin layer. When the cured resin layer 20a is removed afterwards, the cured resin layer 20a formed with a concave portion 22 is obtained (not shown). Then, through-holes 26 and 28 communicated with the concave portion 22 are formed in the vicinity of both ends of the concave portion on the cured resin layer 20a formed with the concave portion 22 by punching to obtain a core-forming mold 20 (see FIG. 1C).

Figure 1D:
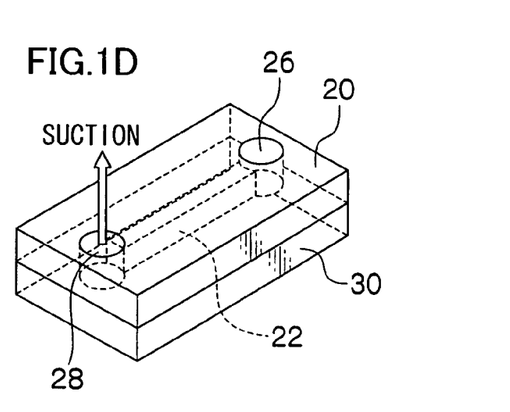
Figure 1E:
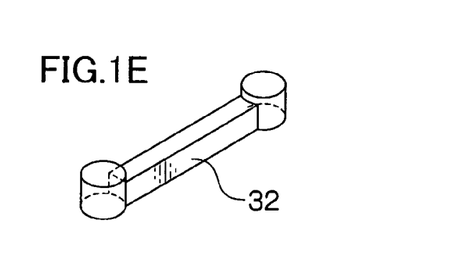

Next, as shown in FIG. 1D, the core-forming mold 20 is brought into close contact with the flat substrate 30. Then, a core-forming curable resin is injected into the through-hole 26 formed in the core-forming mold 20 and sucked under vacuum from the through-hole 28 at the other end to fill the core-forming curable resin into the mold concave portion 22. When, thereafter, the resin is cured, an optical waveguide core 32 is formed. Then, the optical waveguide core 32 is removed from the core-forming mold 20 and the flat substrate 30 to isolate the optical waveguide 32 as shown in FIG. 1E.

Figure 1F:
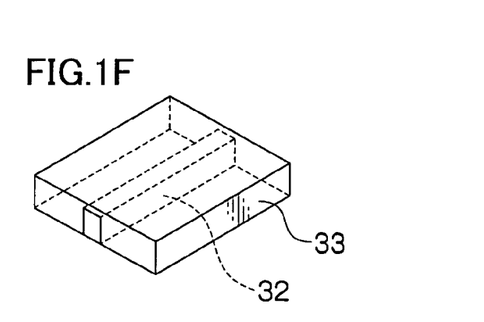

Next, the isolated optical waveguide core 32 is dipped in a liquid reservoir containing a clad-forming curable resin to form a clad-forming curable resin layer prepared by embedding the optical waveguide core 32 in the clad-forming curable resin (not shown). At this time, the liquid reservoir containing the clad-forming curable resin is preferably designed such that, when the optical waveguide core 32 is dipped, it has the same depth as the thickness of an optical waveguide clad of the polymer optical waveguide to be produced. Then, the clad-forming curable resin 33 is cured and an excess end part is removed by cutting after the resin is cured to obtain a polymer optical waveguide provided with the clad-forming curable resin 33 and the optical waveguide 32.

As mentioned above, in the method of producing a polymer optical waveguide according to the invention, the optical waveguide core is not formed on the cladding substrate but the formed optical waveguide core itself is isolated and embedded in the clad-forming curable resin to produce a polymer optical waveguide. Therefore, the thickness of the optical waveguide clad can be arbitrarily designed. Since it is unnecessary to use a clad film in particular, an extremity of thinness can be ensured without any limitation as to the thickness of the clad film if the core is coated with a necessary minimum clad-forming curable resin.

Next, a method of producing a polymer optical waveguide having plural, specifically, four optical waveguide cores will be explained in detail with reference to FIGS. 2A through 2H. The following (A) to (H) correspond to FIGS. 2A through 2H. In FIGS. 2A through 2H, substantially the same parts as the structural elements in FIGS. 1A through 1F are represented by the same symbols.

Figure 2A:
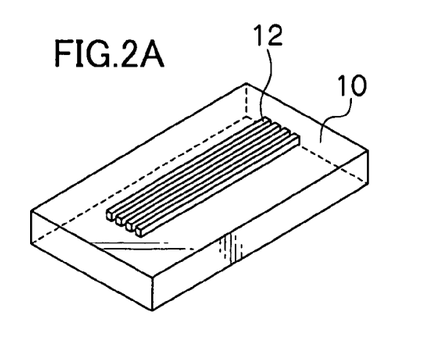
FIGS. 2A through 2H are views explaining the outline of a method of producing a polymer optical waveguide in an embodiment having plural optical waveguide cores.

(A) A master plate formed with plural convex portions corresponding to plural optical waveguide cores respectively is prepared.

Conventional methods such as a photolithographic method may be used without any particular limitation to manufacture a master plate formed with a convex portion corresponding to the optical waveguide core and, if necessary, a positional base line. The method of producing a polymer optical waveguide by an electrodeposition method or a photo-deposition method disclosed in JP-A No. 2002-333538 may be applied to manufacture the master plate (the disclosure of JP-A No. 2002-333538 is incorporated by reference herein). The size of the optical waveguide convex portion formed on the master plate may be properly determined, for example, according to the usage of the polymer optical waveguide. In the case of, for example, a single mode optical waveguide, a core which is about 10 μm by 10 μm square is used and in the case of a multi-mode optical waveguide, a core which is about 50 to 100 μm square is used. Depending on the usage, an optical waveguide having a larger core portion as much as about several hundreds μm is also utilized.

Figure 2B:
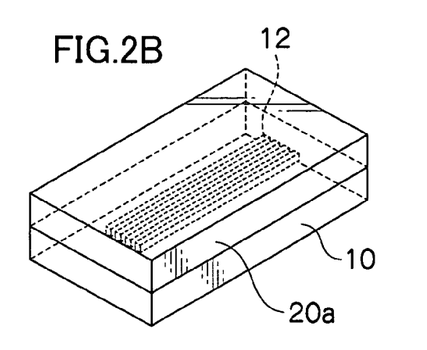

(B) A silicone resin is applied to the master plate and cured by heating to manufacture a core-forming mold made of a silicone resin. The core-forming mold is manufactured by applying or casting a mold-forming curable resin 20a to the master plate 10 and, if necessary, drying, followed by curing the resin and removing the cured resin layer.

In general, the thickness of the cured resin layer is preferably 0.1 to 50 mm though it can be determined appropriately in consideration of the handling characteristics required for the mold.

The mold-forming curable resin preferably has the characteristics that its cured product can be removed easily from the master plate, and it has mechanical strength and dimensional stability equal to or more than a satisfactory level, a hardness enough to keep the shape of the concave portion and high adhesion to the flat substrate. Various additives may be added to the mold-forming curable resin according to the need.

The mold-forming curable resin can be applied or cast to the surface of the master plate. Because it is necessary to accurately copy the convex portions corresponding to the individual cores of the optical waveguide, the mold-forming curable resin preferably has a viscosity equal to or lower than a certain limit, for example, about 500 to 7000 mPa·s. (It is to be noted that "the mold-forming curable resin" includes those made into elastic rubber-like bodies after cured.) Also, a solvent for controlling viscosity may be added to the extent that the adverse influence of the solvent is not exerted.

As the mold-forming curable resin, a curable organopolysiloxane which is made into silicone rubber (silicone elastomer) or a silicone resin is preferably used from the viewpoint of releasability, mechanical strength, dimensional stability, hardness and adhesion to the flat substrate. The curable organopolysiloxane is preferably those containing a methylsiloxane group, ethylsiloxane group and phenylsiloxane group in their molecules. The curable organopolysiloxane may be either one-liquid type or a two-liquid type used in combination with a curing agent, may be a thermosetting type or ambient-temperature-curable type (e.g., a type which is cured by moisture in the air), or may be those utilizing other curing phenomena (e.g., UV curable type).

The curable organopolysiloxane is preferably those made into silicone rubbers after cured. As these siloxanes, those generically called liquid silicone rubbers (the "liquid" includes those having a high viscosity such as paste-like materials) are used. Two-liquid types used in combination with a curing agent are preferable. Among these types, addition type liquid silicon rubbers are preferable because they are cured such that the surface and inside thereof are uniformly cured in a short time, producing no or a little byproduct at this time and have high releasability and small shrinkage ratio.

The curable silicone oligomer, or monomer and the curable silicone resin oligomer or monomer are preferably those containing a methylsiloxane group, ethylsiloxane group and phenylsiloxane group in their molecules. Particularly, a curable dimethylsiloxane rubber oligomer (PDMS) is preferable from the viewpoint of adhesion and releasability.

The viscosity of the liquid silicone rubber is about 500 to 7,000 mPa·s and more preferably about 2,000 to 5,000 mPa·s from the viewpoint of accurately copying the convex portion corresponding to the optical waveguide core, decreasing the mingling of air cells to make it easy to defoam and from the viewpoint of forming a mold having a thickness of several mm.

The surface energy of the core-forming mold is in a range of preferably 5 mN/m to 35 mN/m and more preferably 10 mN/m to 20 mN/m from the viewpoint of adhesion to the flat substrate and the penetration speed of the core-forming curable resin.

The share rubber hardness of the core-forming mold is 15 to 80 and preferably 20 to 60 in view of molding ability, maintenance of the shape of the concave portion and releasability.

The surface roughness (root-mean-square roughness (RMS)) of the core-forming mold is 0.5 μm or less, preferably 0.1 μm or less and more preferably 0.05 μm or less, which can remarkably decrease an optical loss in the optical waveguide characteristics of the formed core.

The above curable organopolysiloxane and particularly, liquid silicone rubber which becomes silicone rubber after cured is superior in the two conflicting characteristics, namely adhesion to and releasability from the flat substrate, has the ability to copy a nanostructure and can prevent even the penetration of a liquid when the silicone rubber is brought into close contact with the flat substrate. The core-forming mold using such silicone rubber copies the master plate with high accuracy and is in close contact with the flat substrate. Therefore, it is possible to fill the core-forming resin efficiently only in the concave portion between the core-forming mold and the flat substrate and it is also easy to remove the flat substrate from the core-forming mold. As a consequence, a polymer optical waveguide that keeps its shape with high accuracy can be manufactured from the core-forming mold.

Moreover, especially in the case where the above cured resin layer has rubber elasticity, a part of the cured resin layer, i.e., parts other than the part for copying the convex portion of the master plate, may be replaced by other rigid material. In this case, the handling characteristics of the mold is improved.

Figure 2C:
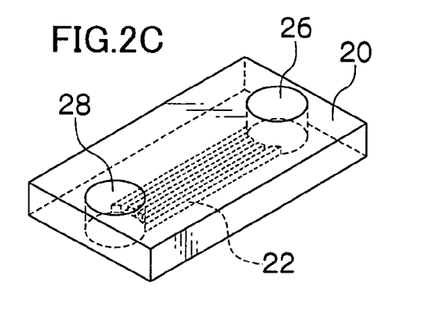

(C) Through-holes for filling the core-forming curable resin are formed in the vicinity of the both sides of the concave portion of the core-forming mold.

In the core-forming mold 20, it is preferable to form through-holes, namely, at least one introduction port for filling the core-forming curable resin into the concave portion 22 corresponding to the convex portion, and at least one discharging port for discharging the resin from the concave portion corresponding to the convex portion. Specifically, as shown in FIG. 2C, through-holes 26 and 28 each communicated with the concave portion are formed in the vicinity of the both ends of the concave portion 22. The though-hole on the introduction side may be utilized as a liquid (resin) trap and the through-hole of the discharging port can connect the inside of the concave portion to a vacuum device by inserting a vacuum suction pipe thereinto. The through-hole may be formed corresponding to each concave portion according to the pitch of the concave portions or one through-hole communicated with each concave portion. Since the present invention involves the process of separating the formed waveguide core portion once from all of the substrate and the mold, it is desirable to form one through-hole communicated with each concave portion from the viewpoint of securing the relative positions of the plural optical waveguide cores, for example, in the case where these cores are arranged at fixed intervals. Arranging in this way provides a structure in which the ends of the waveguide cores are mutually connected by the same curable resin, making it possible to prevent a deviation of the relative positions of the optical waveguide cores. In the simplest means for realizing this, the resin introduction ports and discharge ports are respectively made to be common one and each optical waveguide core is connected through these common introduction port and discharge port.

As illustrated in the Figures, the above-described through-hole may be communicated with the upper surface of the mold. Alternatively, the above-described through-hole may be provided as another concave part communicated with all the plural concave portions. This concave part may be not communicated with the upper surface of the mold, but communicated with the end (side end) of the mold. In this case, a core-forming curable resin is filled from the concave parts on the side ends.

The positional base line may also be formed simultaneously with the optical waveguide core in the same manner. In this case, if the resin-introducing port and discharging port of the positional base line are made to be the same as those of the optical waveguide core, they can be produced simply.

Figure 2D:
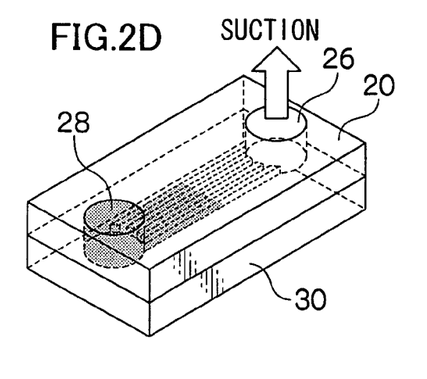

(D) A core-forming curable resin is filled in the concave portion of the core-forming mold.

After the core-forming mold 20 is brought into close contact with the flat substrate 30, the core-forming curable resin is filled in the concave portion by suction and/or by utilizing a capillary phenomenon.

When the core-forming curable resin is filled in the concave portion of the core-forming mold, the flat substrate is brought into close contact with the core-forming mold and the core-forming curable resin is dripped in a small amount on the introduction port of the concave portion to fill it by utilizing a capillary phenomenon, the core-forming curable resin is filled in the concave portion under pressure, or the discharging port of the convex portion is sucked under reduced pressure or both of the filling under pressure and suction under reduced pressure are carried out, whereby the resin can be filled. As mentioned above, the resin may be reserved in the introduction side through-hole to fill the resin in the introduction side through-hole under pressure or a vacuum suction tube communicated with a pump may be inserted into the discharge side through-hole, to thereby be able to suck under reduced pressure.

In the case of using a combination of the above pressure filling and vacuum suction, it is preferable to carry out the both synchronously and it is more preferable to increase the pressure step by step in the pressure filling and to decrease the pressure step by step in the above vacuum suction from the viewpoint of allowing the incompatible condition that the core-forming curable resin is injected at a higher velocity in the state of the mold fixed stably.

As the core-forming curable resin, radiation-curable, electron ray-curable or thermosetting resins may be used. Among these resins, UV (ultraviolet ray) curable resins and thermosetting resins are preferably used.

As the UV curable resin or thermosetting resin for forming the above core, UV curable or thermosetting monomers, oligomers or mixtures of monomers and oligomers are preferably used.

Also, as the UV curable resin, an epoxy-type, polyimide-type or acryl-type UV curable resins are preferably used.

The core-forming curable resin is filled in the gap (the concave portion of the mold) formed between the core-forming mold and the flat substrate and therefore, the core-forming curable resin must have a viscosity low enough to ensure the filling. Also, since curable resins having low viscosity generally have large volumetric shrinkage as described below, there is the case where an adverse influence is exerted if the viscosity is excessively dropped to improve the shape of the core to be formed. Therefore, the viscosity of the above curable resin is preferably 10 mPa·s to 2,000 mPa·s, more preferably 100 mPa·s to 1,300 mPa·s, and still more preferably 250 mPa·s to 800 mPa·s from the viewpoint of filling rate, improvement in core shape and a reduction in optical loss.

In addition, a change in the volume of the core-forming curable resin before and after the resin is cured must be small to reproduce the original shape of the convex portion corresponding to the optical waveguide core formed on the master plate with high accuracy. For example, a reduction in the volume may cause a propagation loss. Therefore, the core-forming curable resin preferably has a volumetric change as small as possible. The resin preferably has a volumetric change of 10% or less, and more preferably has a volumetric change of 0.01 to 4%. It is preferable to avoid lowering viscosity of the resin by using a solvent because this brings about a large change in volume before and after the resin is cured.

In order to reduce a change in volume (shrinkage) of the core-forming curable resin when the resin is cured, a polymer may be added to the resin. As the polymer, those which are compatible with the above core-forming curable resin and do not adversely affect the refractive index, elastic modulus and transmitting characteristics of the resin are preferable. Also, the addition of the polymer not only decreases the volumetric change but also controls the viscosity and the grass transition temperature of the cured resin with high accuracy. As the polymer, an acryl-type, methacrylic acid-type and epoxy-type are used, though not limited thereto.

The refractive index of the cured product of the core-forming curable resin is preferably in a range of 1.20 to 1.60 and more preferably in a range of 1.4 to 1.6. Two or more resins having different refractive indexes falling in the above range are used.

The refractive index of the cured product of the core-forming curable resin must be larger than that of the cured product of a clad-forming curable resin which becomes an optical waveguide clad. A difference between the refractive index of the core and that of the clad is preferably 0.001 or more, and more preferably 0.02 or more.

Moreover, in this step, the pressure in the entire system is preferably reduced (about 0.1 to 100 kPa) to promote the filling of the core-forming curable resin into the concave portion of the mold by utilizing a capillary phenomenon.

Also, in order to promote the filling, it is an effective means to drop the viscosity of the core-forming curable resin to be filled from the introduction port of the mold by heating it in addition to the reduction in the pressure of the system.

The filled core-forming curable resin is cured. In order to cure a UV curable resin, a ultraviolet lamp, ultraviolet LED, UV radiator or the like is used. Also, heating in an oven is used to cure a thermosetting resin.

Figure 2E:
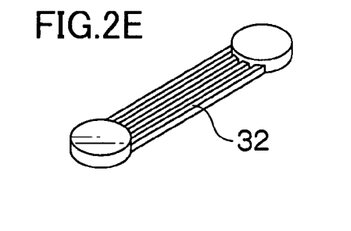

(E) The core-forming mold is removed from the flat substrate to isolate an optical waveguide core.

The core-forming curable resin is cured to form an optical waveguide core and then the optical waveguide core is removed from the core-forming mold and the flat substrate (FIG. 2E). The resulting optical waveguide core 32 has a structure in which the end parts of the core are connected with each other by the same cured resin.

In the invention, adhesion when the resin is solidified is controlled by a combination of the flat substrate stuck to the underside of the core-forming mold and the core-forming curable resin to be filled. Then, after the core-forming mold is removed (peeled off), the formed optical waveguide core part is also removed from the flat substrate by selecting the combination of the flat substrate which has a weak adhesion though it is stronger than the core-forming mold and the core-forming curable resin to be filled.

As to a specific combination of the resin and the flat substrate, combinations of a Zeonea film (trade name, manufactured by Nippon Zeon Co., Ltd.) as the flat substrate and a UV curable epoxy or UV curable acryl resin (the both are manufactured by NTT-AT) which exhibits strong adhesiveness to a glass substrate as the filler resin are preferably used.

Also, as the flat substrate, flat molded articles of Zeonex (trade name, manufactured by Nippon Zeon Co., Ltd.) and glass substrates coated with fluorine which reduces surface energy may be likewise used. If a SAITOP film which is wholly fluorinated polymer or a glass substrate coated with a SAITOP is used as the flat substrate, the adhesion of the flat substrate is lower than that of core-forming mold, and therefore, the optical waveguide core portion is left on the side of the core-forming mold in the process of removing the core-forming mold. In this case, it is difficult to take out the optical waveguide core part.

Figure 2F:
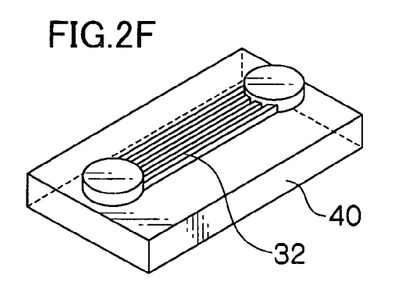

(F) The optical waveguide core is placed on the flat substrate.

The optical waveguide core 32 removed from the core-forming mold 20 and the optical waveguide core 32 is mounted on a flat substrate 40 (FIG. 2F). As the flat substrate, the same one as the flat substrate with which the above core-forming curable resin is brought into close contact may be used.

Figure 2G:
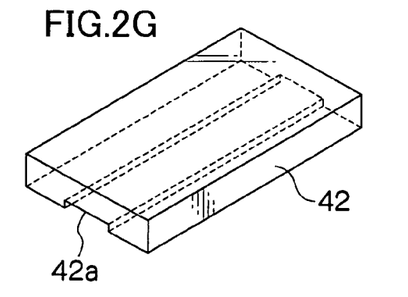

(G) A clad-forming mold is prepared.

A clad-forming mold 42 provided with a concave portion 42a corresponding to the optical waveguide clad is prepared (FIG. 2G). The concave portion 42a of the clad-forming mold 42 has a shape and size enabling the optical waveguide core 32 to be accommodated and has the same thickness as the polymer optical waveguide to be produced. Then, the clad-forming mold 42 is brought into close contact with the flat substrate 40 mounted with the optical waveguide core 32 such that the optical waveguide core 32 is accommodated in the concave portion 42a of the clad-forming mold 42 (not shown).

Next, a clad-forming curable resin is introduced into and filled in the concave portion 42a of the clad-forming mold 42 by suction and/or by utilizing a capillary phenomenon. This may be carried out in the same manner as in the case of filling the core-forming curable resin into the concave portion of the aforementioned core-forming mold. The clad forming curable resin is filled into a hollow space of the concave portion 42a of the clad-forming mold 42 that is between the clad-forming mold 42 and the substrate 40 not filled by the optical waveguide core 32.

As the clad-forming curable resin, a UV curable resin or thermosetting resin is preferably used and, for example, a UV curable or thermosetting monomer, oligomer or a mixture of the monomer and oligomer is used.

In order to decrease a change in volume (shrinkage) when the clad-forming curable resin is cured, a polymer (e.g., a methacrylic acid-type or an epoxy-type) which is compatible with the resin and does not adversely affect the refractive index, elastic modulus and transmitting characteristics of the resin may be added.

In such an embodiment in which the clad-forming curable resin is filled in the concave portion of the clad-forming mold, the resin preferably has such a sufficiently low viscosity as in the case of the aforementioned core-forming curable resin. Specifically, the viscosity is preferably 2,000 mPa·s or less and more preferably 800 mPa·s or less.

Next, energy capable of curing the resin is applied to the resin corresponding to the resin filled in the concave portion 42a of the clad-forming mold 42 to cure the clad-forming curable resin to complete a polymer optical waveguide. In order to cure the UV curable resin, a ultraviolet lamp, ultraviolet LED, UV radiator or the like is used. Also, heating in an oven is used to cure a thermosetting resin.

Figure 2H:
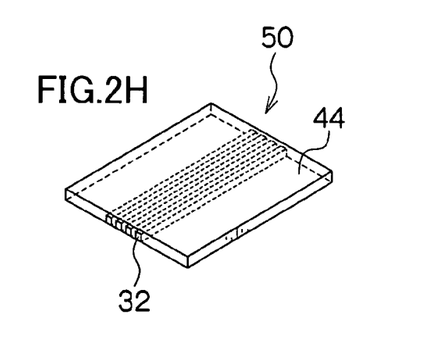

(H) The flat substrate is removed from the clad-forming mold to isolate a polymer optical waveguide.

After the clad-forming curable resin is cured, the flat substrate 40 is removed from the clad-forming mold 42 to thereby obtain a polymer optical waveguide 50 in which the optical waveguide core 32 is embedded in the optical waveguide clad 44 (FIG. 2H).

The depth of the concave portion of the above clad-forming mold may be appropriately designed according to the thickness of a polymer optical waveguide to be produced. Particularly, in the invention, the polymer optical waveguide may be designed to have a small thickness and for example, a clad layer having a thickness of about 5 to 30 μm may be formed on upper and lower sides of the core. In the case where the core diameter is 50 μm, the film thickness of the polymer optical waveguide to be produced may be designed to be 60 to 110 μm.

EXAMPLES

The present invention will be hereinafter explained in more detail by way of examples. However, the examples should not be construed to limit the scope of the invention.

Example 1

A thick film resist (SU-8) is applied to a Si substrate by a spin coating method, prebaked at 80° C., exposed to light through a photomask and developed and post-baked at 120° C. to form a convex portion corresponding to 8 channel-waveguide array (8 optical waveguide cores) having a core diameter of 50 μm at a pitch of 250 μm as a master plate.

Next, a releasing agent is applied to the master plate and then PDMS is applied and cured by heated at 120° C. for 30 minutes, followed by removing the PDMS to manufacture a 5-mm-thick core-forming mold having a concave portion having a core diameter of 50 μm.

Next, an 1-mm-dia through-hole penetrating the mold from just above the end of the concave portion corresponding to an optical waveguide core of the core-forming mold is formed as a core-forming curable resin-introduction and discharging port. When this core-forming mold is brought into contact with a Zeonea film (trade name, manufactured by Nippon Zeon Co., Ltd.) which is vacuum-chucked on a plate glass as a flat substrate, the both are stuck to each other.

An epoxy-type UV curable resin (manufactured by NTT-AT) having a viscosity of 500 mPa·s is dripped as a core-forming curable resin on the resin-introducing port and sucked under 20 kPa from the opposite side resin discharging port in the PDMS mold put in this condition, with the result that the UV curable resin is filled in all region in about one minute.

In the above condition, the resin is irradiated with 50 mW/cm$^2$ UV light for 10 minutes to solidify the resin and then the PDMS is removed (peeled off by deforming it in the longitudinal direction of the waveguide, with the result that the cured UV curable resin (refractive index: 1.54) is removed first from the PDMS and then from the Zeonea film having insufficient adhesiveness. Because all waveguide cores made of the aforementioned cured UV curable resin (optical waveguide core) are communicated at the through-hole part, the relative position (250 μm pitch) of each waveguide is kept. Hereinafter, plural optical waveguide cores obtained by connecting optical waveguide cores is referred to as "waveguide core array".

Next, a PDMS plate provided with a cavity having a depth of 80 μm in the peripheral part and a depth of 100 μm in the center part is prepared. A UV curable resin put in a liquid state and having a refractive index of 1.51 is filled as a clad-forming curable resin and the waveguide core array produced above is placed such that the end thereof is extended to the peripheral part. The resin is irradiated with 50 mW/cm$^2$ UV light for 10 minutes to cure the resin and then the PDMS is removed to form a flexible film waveguide core array. Finally, the resin-introducing port and discharging port which are connecting parts are cut by a dicing saw to complete a polymer optical waveguide.

The polymer optical waveguide produced in the above manner has a thickness of about 100 μm and has sufficient flexibility. The entire of the polymer optical waveguide can be bent to the extent that the radius of curvature is about 3 mm. Also, the thicknesses of the lower clad and the upper clad are respectively about 25 μm, ensuring that the waveguide can exhibit sufficient light-confining ability.

Example 2

A thick film resist (SU-8) is applied to a Si substrate by a spin coating method, prebaked at 80° C., exposed to light through a photomask and developed and post-baked at 120° C. to form a convex portion corresponding to 8 channel-waveguide core array (8 optical waveguide cores) which has a core diameter of 50 μm and a convex portion corresponding to a positional base line for cutting, to make a master plate. The convex portion corresponding to 8 channel-waveguide core array has pitch (interval) of 250 μm at one end and that of 2 mm at the other end, the core array altering the pitch (interval) from 250 μm to 2 mm.

Next, a releasing agent is applied to the master plate and then PDMS is applied and solidified by heated at 120° C. for 30 minutes, followed by removing the PDMS to manufacture a 5-mm-thick core-forming mold having a concave portion having a core diameter of 50 μm.

Next, an 1-mm-dia through-hole penetrating the mold from the just above to the 250 μm-pitch side end of the concave portion corresponding to an optical waveguide core of the core-forming mold is formed as a resin-introducing port. Also, a long hole-like 14-mm-long through-hole communicated with all optical waveguide core terminals is formed at the 2 mm-pitch side end as a resin-discharging port. Also, the above resin-introducing port and discharging port are used also as those of the positional base line. When this core-forming mold is brought into contact with a Zeonex plate (thickness: 5 mm) used as a flat substrate, the both are stuck to each other.

An epoxy-type UV curable resin (manufactured by NTT-AT) having a viscosity of 500 mPa·s is dripped as a core-forming curable resin on the resin-introducing port and sucked under 20 kPa from the opposite side resin discharging port in the core-forming mold put in this condition, with the result that the UV curable resin is filled in all region in about 1 minute.

In the above condition, the resin is irradiated with 50 mW/cm$^2$ UV light for 10 minutes to cure the resin and then the PDMS is removed (peeled off) by deforming the core-forming mold in the longitudinal direction of the waveguide, with the result that the cured UV curable resin (refractive index: 1.54) is removed first from the core-forming mold and then from the Zeonex plate having insufficient adhesiveness. Because all optical waveguide cores made of the aforementioned cured UV curable resin (waveguide core array) are communicated at the through-hole part, the relative position of each waveguide is kept.

Next, a PDMS plate provided with a cavity having a depth of 80 μm in the peripheral part and a depth of 100 μm in the center part is prepared. A UV curable resin put in a liquid state and having a refractive index of 1.51 is filled in the cavity and the waveguide core array produced above is placed such that the end thereof is extended to the peripheral part. The resin is irradiated with 50 mW/cm$^2$ UV light for 10 minutes to cure the resin and then the core-forming mold is removed to form a flexible film waveguide core array. Finally, the connecting parts are cut utilizing the positional base line by a dicing saw to complete a polymer optical waveguide.

The polymer optical waveguide produced in the above manner has a thickness of about 100 μm and has sufficient flexibility. The entire of the polymer optical waveguide can be bent to the extent that the radius of curvature is about 3 mm. Also, the thicknesses of the lower clad and the upper clad are respectively about 25 μm, ensuring that the waveguide can exhibit sufficient light-confining ability.

What is claimed is:

1. A method of producing a polymer optical waveguide, the method comprising:
   preparing a core-forming mold having a concave portion corresponding to at least one optical waveguide core;
   bringing a concave side of the core-forming mold into close contact with a first flat substrate;
   filling a core-forming curable resin into the concave portion by suction and/or by utilizing a capillary phenomenon;
   curing the core-forming curable resin to form an optical waveguide core;
   removing the optical waveguide core from the core-forming mold and the first flat substrate;
   preparing a clad-forming mold having a concave portion corresponding to an optical waveguide clad;
   bringing the clad-forming mold into close contact with a second flat substrate having the optical waveguide core, which has been removed from the core-forming mold and the first flat substrate, disposed thereon so that the optical waveguide core is contained in the concave portion of the clad-forming mold;
   filling a clad-forming curable resin into a hollow space in the concave portion of the clad-forming mold by suction and/or by utilizing a capillary phenomenon, the hollow space consisting of the space between the clad-forming mold and the second flat substrate not filled by the optical waveguide core;
   curing the clad-forming curable resin; and
   removing the cured clad-forming curable resin containing the optical waveguide core from the clad-forming mold and the second flat substrate.

2. A method of producing a polymer optical waveguide, the method comprising:
   preparing a core-forming mold having a concave portion corresponding to at least one optical waveguide core;
   bringing a concave side of the core-forming mold into close contact with a first flat substrate;
   filling a core-forming curable resin into the concave portion by suction and/or by utilizing a capillary phenomenon;
   curing the core-forming curable resin to form an optical waveguide core;
   removing the optical waveguide core from the core-forming mold and the first flat substrate;
   preparing a clad-forming mold having a concave portion corresponding to an optical waveguide clad;
   bringing the clad-forming mold into close contact with a second flat substrate having the optical waveguide core, which has been removed from the core-forming mold and the first flat substrate, disposed thereon so that the optical waveguide core is contained in the concave portion of the clad-forming mold;
   filling a clad-forming curable resin into a hollow space in the concave portion of the clad-forming mold by suction and/or by utilizing a capillary phenomenon, the hollow space consisting of the space between the clad-forming mold and the second flat substrate not filled by the optical waveguide core;
   curing the clad-forming curable resin; and
   removing the cured clad-forming curable resin containing the optical waveguide core from the clad-forming mold and the second flat substrate,
   wherein the core-forming mold is provided with through-holes in a vicinity of both ends of the concave portion.

3. A method of producing a polymer optical waveguide, the method comprising:
   preparing a core-forming mold having a concave portion corresponding to at least one optical waveguide core;
   bringing a concave side of the core-forming mold into close contact with a first flat substrate;
   filling a core-forming curable resin into the concave portion by suction and/or by utilizing a capillary phenomenon;
   curing the core-forming curable resin to form an optical waveguide core;
   removing the optical waveguide core from the core-forming mold and the first flat substrate;
   preparing a clad-forming mold having a concave portion corresponding to an optical waveguide clad;

bringing the clad-forming mold into close contact with a second flat substrate having the optical waveguide core, which has been removed from the core-forming mold and the first flat substrate, disposed thereon so that the optical waveguide core is contained in the concave portion of the clad-forming mold;

filling a clad-forming curable resin into a hollow space in the concave portion of the clad-forming mold by suction and/or by utilizing a capillary phenomenon, the hollow space consisting of the space between the clad-forming mold and the second flat substrate not filled by the optical waveguide core;

curing the clad-forming curable resin; and removing the cured clad-forming curable resin containing the optical waveguide core from the clad-forming mold and the second flat substrate, wherein the core-forming mold has a plurality of concave portions corresponding to the optical waveguide core and provided with through-holes that are communicated with all of the plurality of concave portions in a vicinity of both ends of the plurality of concave portions.

4. The method of claim 1 wherein the core-forming mold comprises at least one of a silicone rubber and a silicone resin.

5. The method of claim 1 wherein the core-forming mold has a surface energy of 5 mN/m to 35 mN/in.

6. The method of claim 1 wherein the core-forming curable resin comprises at least one of a UV curable resin and a thermosetting resin.

7. The method of claim 1 wherein the core-forming curable resin comprises at least one selected from the group consisting of an epoxy UV curable resin, a polyimide UV curable resin and an acryl UV curable resin.

8. The method of claim 1 wherein the core-forming curable resin has a viscosity of 10 mPa·s to 2,000 mPa·s.

9. The method of claim 1 wherein a cured product of the core-forming curable resin has a refractive index in a range of 1.20 to 1.60.

10. The method of claim 1 wherein adhesiveness of the first flat substrate to the core-forming curable resin is greater than that of the core-forming mold to the core-forming curable resin.

* * * * *